(12) United States Patent
Lee et al.

(10) Patent No.: US 6,243,173 B1
(45) Date of Patent: Jun. 5, 2001

(54) METHOD AND APPARATUS FOR CORRECTING ALIGNMENT ERROR OF SCANNING HEAD OF A SHUTTLE TYPE SCANNER

(75) Inventors: Hyuk-jae Lee; Goo-soo Gahang, both of Seoul (KR)

(73) Assignee: SamSung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/115,760

(22) Filed: Jul. 15, 1998

(30) Foreign Application Priority Data

Jul. 15, 1997 (KR) .................................................. 97/32746

(51) Int. Cl.$^7$ ................................ H04N 1/04; H04N 1/00
(52) U.S. Cl. ............................ 358/488; 358/474; 358/406
(58) Field of Search ................................... 358/488, 474, 358/483, 472, 498, 494, 285, 443, 471, 406, 504

(56) References Cited

U.S. PATENT DOCUMENTS

| 4,558,461 | * | 12/1985 | Schlang et al. ..................... 382/296 |
| 5,144,455 | * | 9/1992 | Stein et al. ........................... 358/443 |
| 5,250,956 |   | 10/1993 | Haselby et al. ....................... 346/1.1 |
| 5,280,370 | * | 1/1994 | Faust et al. ........................... 358/488 |
| 5,297,017 |   | 3/1994 | Haselby et al. ....................... 346/1.1 |
| 5,629,771 | * | 5/1997 | Mikami et al. ....................... 358/296 |
| 5,644,344 |   | 7/1997 | Haselby ................................. 347/19 |
| 5,664,076 | * | 9/1997 | Pluta et al. ............................ 395/117 |
| 5,818,976 | * | 10/1998 | Pasco et al. .......................... 382/296 |
| 5,902,993 | * | 5/1999 | Okushiba et al. .................. 250/208.1 |
| 5,912,448 | * | 6/1999 | Sevier et al. .......................... 358/488 |

* cited by examiner

*Primary Examiner*—Cheukfan Lee
(74) *Attorney, Agent, or Firm*—Robert E. Bushnell, Esq.

(57) ABSTRACT

Disclosed are a method and an apparatus for correcting an alignment error of a scanning head of a shuttle type scanner capable of compensating an error occurred in a manufacturing process of a product or the alignment error generated by an impact applied in use. When an alignment error correction mode is selected at a preset time, the scanning head is moved to a position facing a correcting pattern formed on a correction plate. The correcting pattern is scanned through the scanning head and the alignment error is calculated from the scanned pattern image data using a predetermined operation function. After performing a first correction to the calculated alignment error by moving first and last pixels of the image data, a second correction to the alignment error is performed by applying a preset correction function to remaining pixels excluding the first and last pixels. As a result, unnecessary operations occurred in correcting the alignment error mechanically are removed, thereby increasing the productivity. In addition, since the alignment error within the permitted limit is corrected by the software, a stable image data without any distortion can be obtained.

21 Claims, 7 Drawing Sheets

Alignment error

Alignment error

FIG. 7B

METHOD AND APPARATUS FOR CORRECTING ALIGNMENT ERROR OF SCANNING HEAD OF A SHUTTLE TYPE SCANNER

CLAIM OF PRIORITY

This application makes reference to, incorporates the same herein, and claims all benefits accruing under 35 U.S.C §119 from an application entitled Method And Apparatus For Correcting Alignment Error Of Scanning Head Of A Shuttle Type Scanner earlier filed in the Korean Industrial Property Office on Jul. 15, 1997, and there duly assigned Serial No. 97-32746 by that Office.

BACKGROUND OF THE INVENTION

1. Field of the Invention

The present invention relates to a method and an apparatus for correcting an alignment error of a scanning head of a shuttle type scanner and, more particularly to a method and an apparatus for correcting an alignment error of a scanning head of a shuttle type scanner capable of compensating an error occurred in a manufacturing process of a product or the alignment error generated by an impact applied in use.

2. Description of the Related Art

Conventionally, a scanning head having an optical sensor in a shuttle type scanner is transported exactly transverse to a document transporting (feeding) direction. This means that there should be an alignment error equal to zero (0), or no alignment error. Thus, the image distortion does not occur in the scanned image data. Since it is impossible, however, to manufacture a perfect product which has no alignment error due to a manufacturing process or other reasons, the shuttle scanners which are currently being produced are designed to ignore an alignment error within a predetermined limit. Here, the limit of the alignment error varies according to manufacturers of a relevant product and each product. The alignment error limit is roughly set $\Phi<4°$ wherein, $\Phi$ is an error angle. Accordingly, a product having an alignment error exceeding this limit, it is regarded as an inferior product and a process for mechanically rearranging the alignment error is performed. In the case of a product having the alignment error within this limit, even if the alignment error occurs, it is ignored and the product can be used.

However, in the conventional shuttle type scanner, there is no method for correcting the alignment error regarding the products having the alignment error within the permitted limit. As a result, since the product is continuously used ignoring the alignment error, when a document in a normal state is scanned and the scanned image data is printed, image distortion can occur in the printed image.

It is well known in the art to use the scanner's optical sensor to check for and correct for misalignment of a printing head in a multifunction machine having an optical sensor and ink cartridge, as evidenced by U.S. Pat. No. 5,250,956 to Robert D. Haselby et al. entitled Print Cartridge Bidirectional Alignment In Carriage Axis, U.S. Pat. No. 5,297,017 to Robert D. Haselby et al. entitled Print Cartridge Alignment In Paper Axis and U.S. Pat. No. 5,644,344 to Robert D. Haselby entitled Optical-Print Cartridge System. I have determined, however, that should the print cartridge of the prior art be properly aligned and the optical sensor misaligned, then print cartridge alignment will be changed unnecessarily, resulting in a distorted printed image.

SUMMARY OF THE INVENTION

Therefore, it is an object of the present invention to provide a method for correcting an alignment error of a scanning head having an optical sensor of a shuttle type scanner capable of obtaining a normal print state when performing a scanning operation using the shuttle type scanner.

It is another object of the present invention to provide an apparatus for correcting the alignment error of the scanning head having an optical sensor of the shuttle type scanner.

According to one aspect of the present invention, when an alignment error correction mode is selected, the scanning head is moved to a position facing a correcting pattern formed on a correction plate. The correcting pattern is scanned through the scanning head and the alignment error is calculated from image data of the scanned pattern using a predetermined operation function. After performing a first correction to the calculated alignment error by moving first and last pixels of the image data, a second correction to the alignment error is performed by applying a preset correction function to remaining pixels excluding the first and last pixels.

Selectively, an alignment error correction mode can be set when manufacturing the scanner, when starting the scanning operation, or for every line in which the scanning operation is performed.

Preferably, the correcting pattern has a size of 1×N pixels (here, N is a positive number) in the direction to which the scanning head performs a reciprocatory movement and in the direction perpendicular to the reciprocating movement of the scanning head, respectively. At this time, the size of the correcting pattern in the direction which is vertical to the direction of the reciprocating movement of the scanning head is set to have an equal number of pixels on the vertical axis of the scanning head.

Selectively, the correcting pattern can be set to have an optional color capable of being scanned by the scanning head. Preferably, the correcting pattern has a black color.

Preferably, the operation function is $$\Phi = \tan^{-1} D/V$$

wherein, $\Phi$ is an error angle, V is a total number of pixels in the vertical axis and D is the alignment error of the horizontal axis.

Preferably, when performing the first correction, the last pixel is moved in order to be positioned on the same vertical axis as the first pixel.

Preferably, the correction function is a correction function of $$d/dV \text{drop} D = -V \times \tan \Phi$$

wherein, D is the alignment error of the horizontal axis, V is the total number of pixels of the vertical axis and $\Phi$ is the error angle.

According to another aspect of the present invention, the apparatus for correcting the alignment error of the scanning head of the shuttle type scanner includes: a correction plate which is mounted at a path on which the scanning head performs the reciprocating movement facing the scanning head and includes a correcting pattern which is formed to have a certain size therein; a memory for storing the pattern image data scanned by the scanning head; an operation unit which calculates the alignment error of the pattern image data stored in the memory using a preset operation function; and a central processing unit which controls the reciprocating movement of the scanning head, controls the operation unit to calculate the alignment error of the pattern image data and corrects the calculated alignment error using the correction function.

Preferably, the correction plate is mounted at the path on which the scanning head performs the reciprocating movement, and mounted at a position out of a scanning region of the image recorded in the document. Selectively, the correction plate can be mounted at a left end of the path on which the scanning head performs the reciprocating movement or at a right end of the path.

Preferably, the correcting pattern has an optional color capable of being scanned by the scanning head. More preferably, the correcting pattern has a black color.

Preferably, the correcting pattern has a size of 1 pixel in the direction to which the scanning head performs a reciprocating movement and has a size as many as pixels capable of being scanned by the scanning head in the direction vertical to the reciprocating movement of the scanning head. Selectively, the correcting pattern has a band shape having 1×128 pixels.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1A:
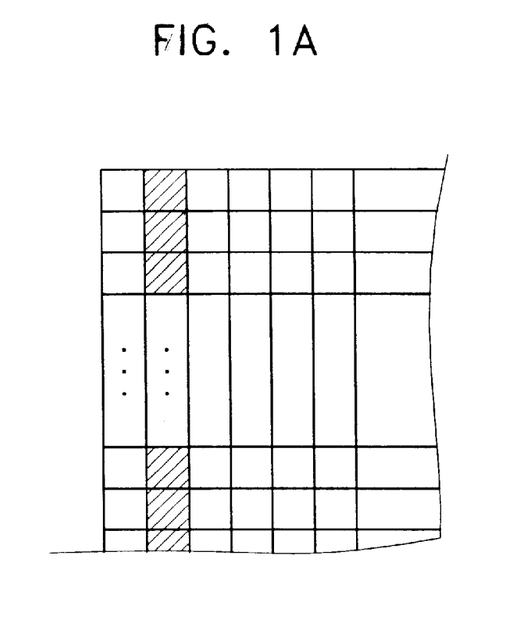
FIG. 1A is a view illustrating an image of a document which is divided per unit of pixel.
Figure 1B:
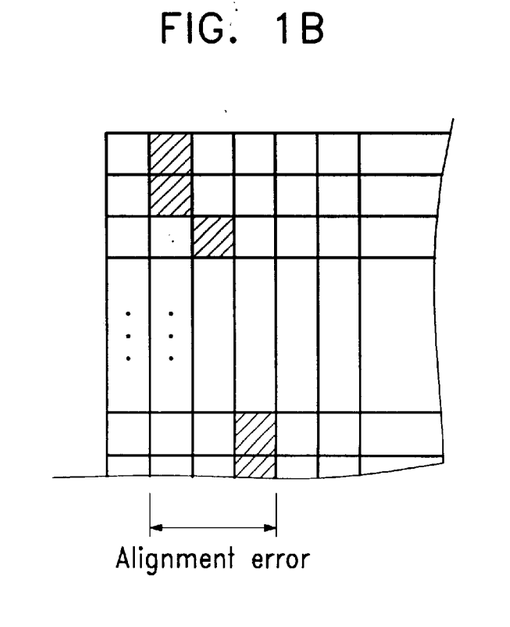
FIG. 1B is a view illustrating the state that an alignment error is occurred when scanning the image of the document of FIG. 1A.

FIG. 1A illustrates an image of a document which is divided into a plurality of pixels and FIG. 1B illustrates the occurrence of an alignment error when scanning the image (depicted by the shaded blocks) of the document of FIG. 1A.

Figure 2:
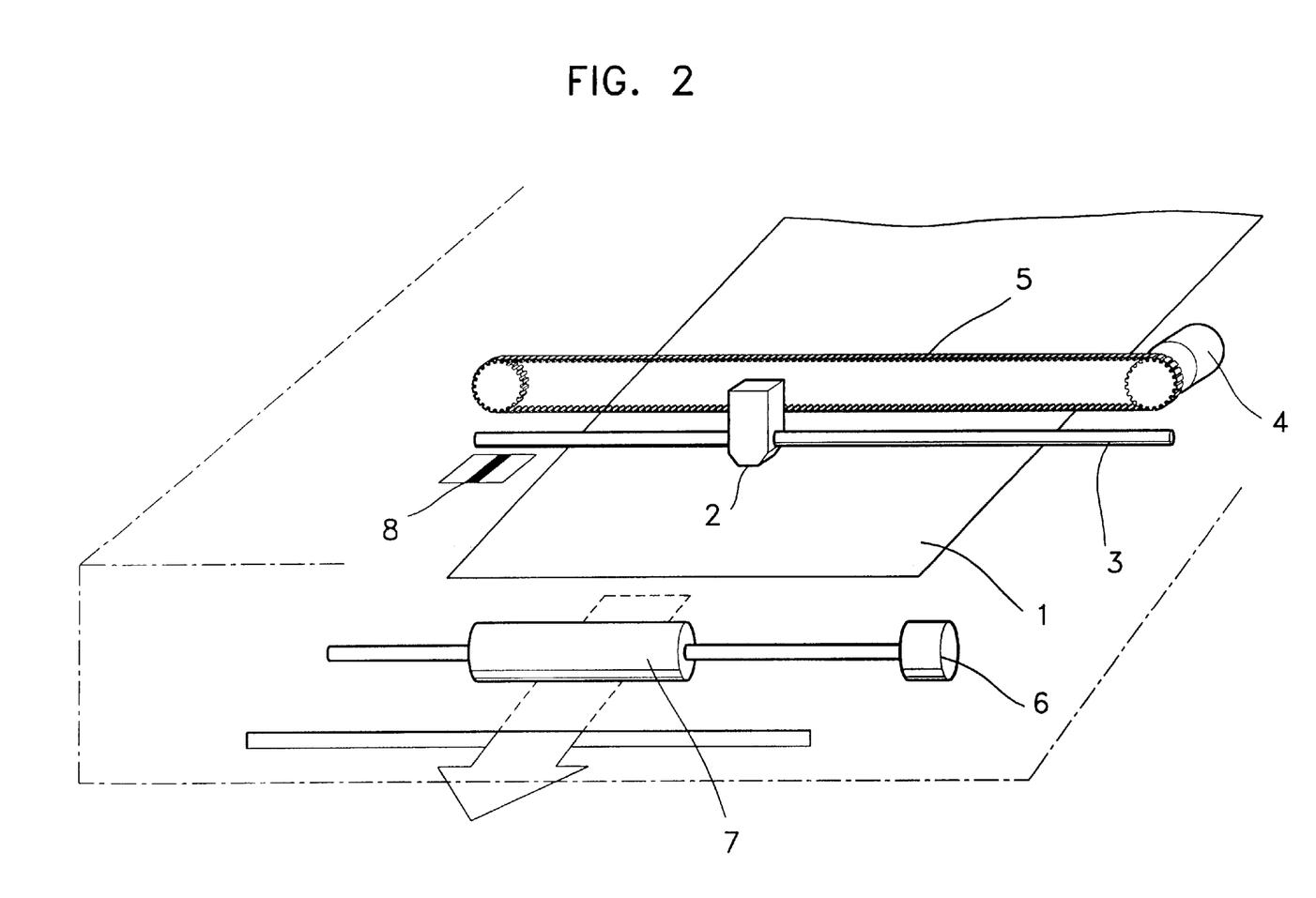
FIG. 2 is a structural view roughly illustrating a shuttle type scanner applied to the present invention.
Figure 3A:
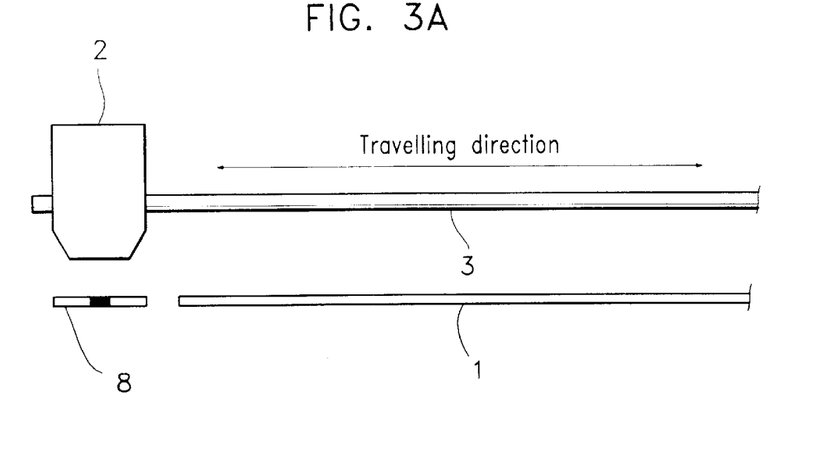
FIGS. 3A and 3B are detailed views of main parts in FIG. 2.
Figure 3B:
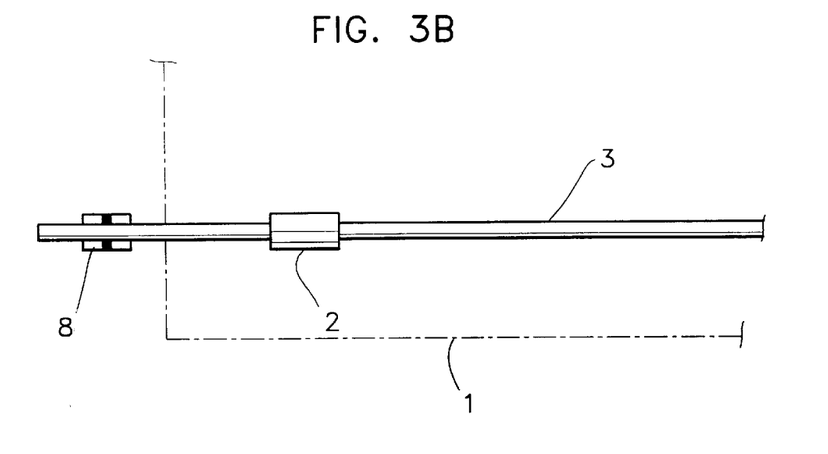

FIG. 2 is a structural view roughly illustrating a shuttle type scanner applied to the present invention and FIGS. 3A and 3B are detailed views of main parts in FIG. 2. In addition, FIG. 3C is a detailed structural view of a correction plate illustrated in FIG. 2.

Referring to FIGS. 2 to 3B, the shuttle type scanner is comprised of a scanning head 2 including a optical sensor (not shown) for scanning an image recorded on a document 1. A guide rail 3 guides scanning head 2 during a reciprocating movement of scanning head 2 transverse to a document feeding (transport) direction (indicated by the arrow in FIG. 2). A carriage return motor 4 provides a driving force to a transporting belt 5, which in turn provides the driving force to scanning head 2 causing scanning head 2 to perform the reciprocating movement. A feed motor 6 and a transporting roller 7 transporting document 1 in the document feeding direction. A correction plate 8 is attached at a position out of a scanning region of document 1 and faces the optical sensor of scanning head 2 when scanning head 2 is moved to a farthest point on one side of the reciprocating movement, i.e., the left side in the figures. Optionally, correction plate 8 can be optionally mounted on a position facing the optical sensor out of the scanning region of the document 1 when the scanning head 2 is moved to farthest point on the other side of the reciprocating movement, i.e., the right side in the figures.

Figure 3C:
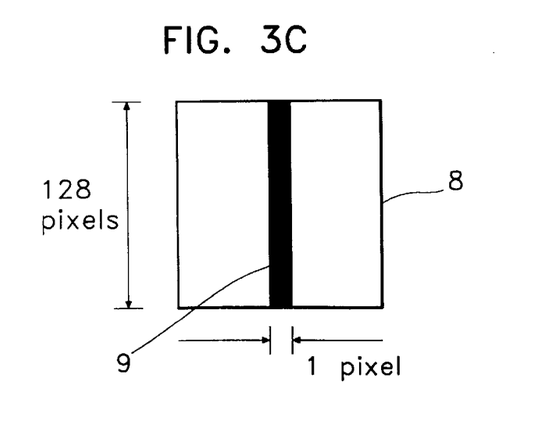
FIG. 3C is a detailed structural view of a correction plate illustrated in FIG. 2.

As shown in FIG. 3C, correcting pattern 9 is formed along a center axis of correction plate 8, and in the preferred embodiment, correcting pattern 9 is one (1) pixel wide by N pixels long, wherein the N pixels are formed along the above mentioned center axis, which is parallel to the document feeding direction. Preferably, the optical sensor of scanner head 2 comprises a charge coupled device for scanning an area of 1×128 in pixel size and the value N for correcting pattern 9 is equal to 128. Correcting pattern 9 has a black color, or other optional color, and may be permanently formed on correction plate 8 or may be removably attached to permit replacement or to change the color of pattern 9. Accordingly, the size and color can vary according to a manufacturing standard of the product.

Figure 4:
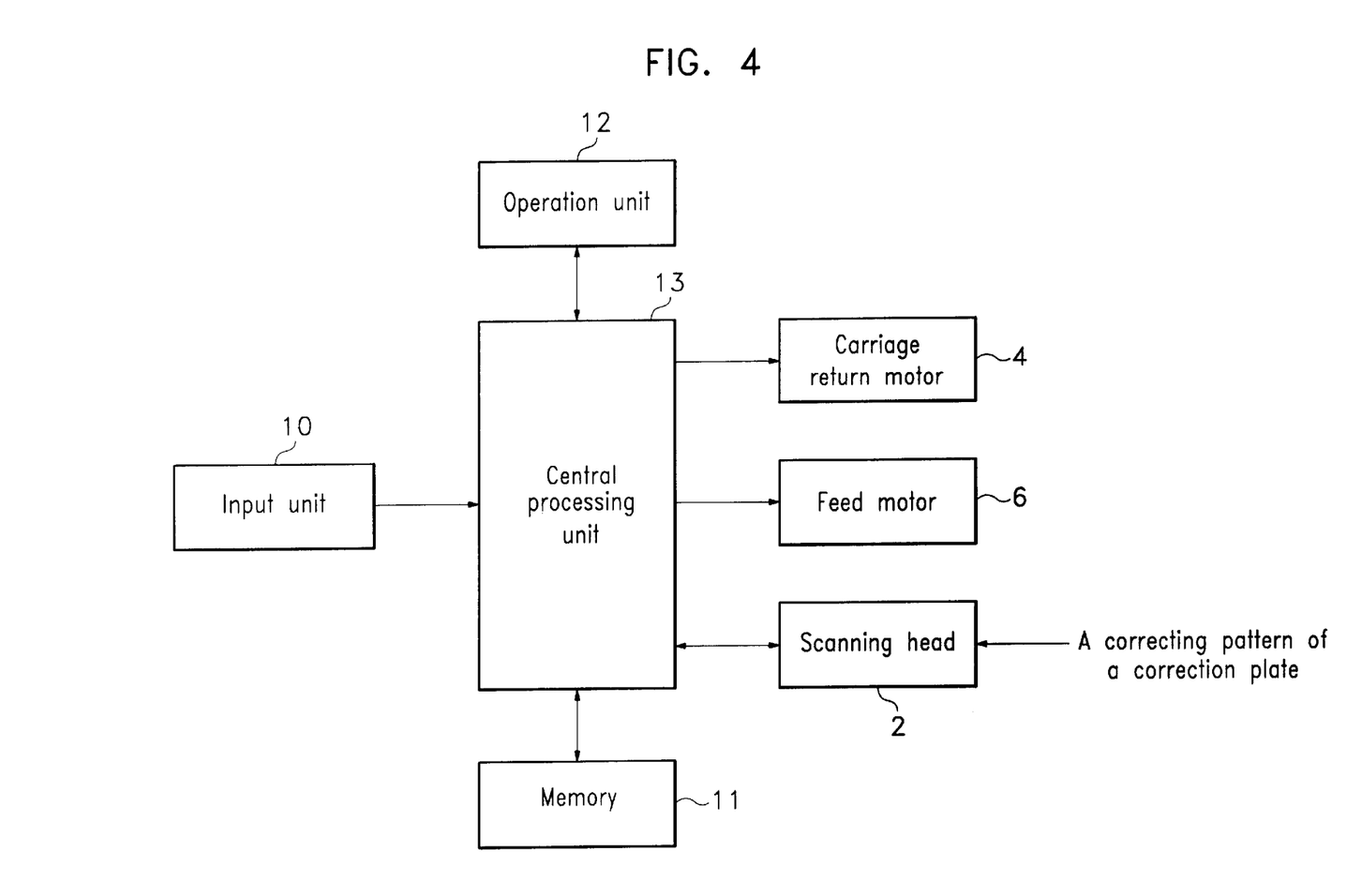
FIG. 4 is a block diagram roughly illustrating a shuttle type scanner according to the present invention.

As shown in FIG. 4, the shuttle type scanner including the aforesaid carriage return motor 4, feed motor 6 and scanning head 2, further includes: an input unit 10 in which a plurality of function keys are arranged for selecting an alignment error correcting function and other various functions; a memory 11 which stores a pattern image of correcting pattern 9 input by scanning head 2, an image data of document 1 and various kinds of programs for correcting the alignment error; an operation unit 12 for performing an operation for correcting the alignment error of scanning head 2 using the pattern image data input by scanning head 2; and a central processing unit 13 for controlling each component part according to programs stored in the memory 11.

The operation of the present invention having the above structure is explained referring to FIGS. 5 to 7B. First, central processing unit 13 checks whether an alignment error correction mode is selected (step S1). The time for starting the correction in the alignment error correction mode can be set to perform the correction once when manufacturing the scanner. It is also possible to set the error correction mode to repeatedly perform the correction whenever starting the operation of the scanner, or to set the error correction mode to repeatedly perform the correction whenever scanning a new line.

Figure 5:
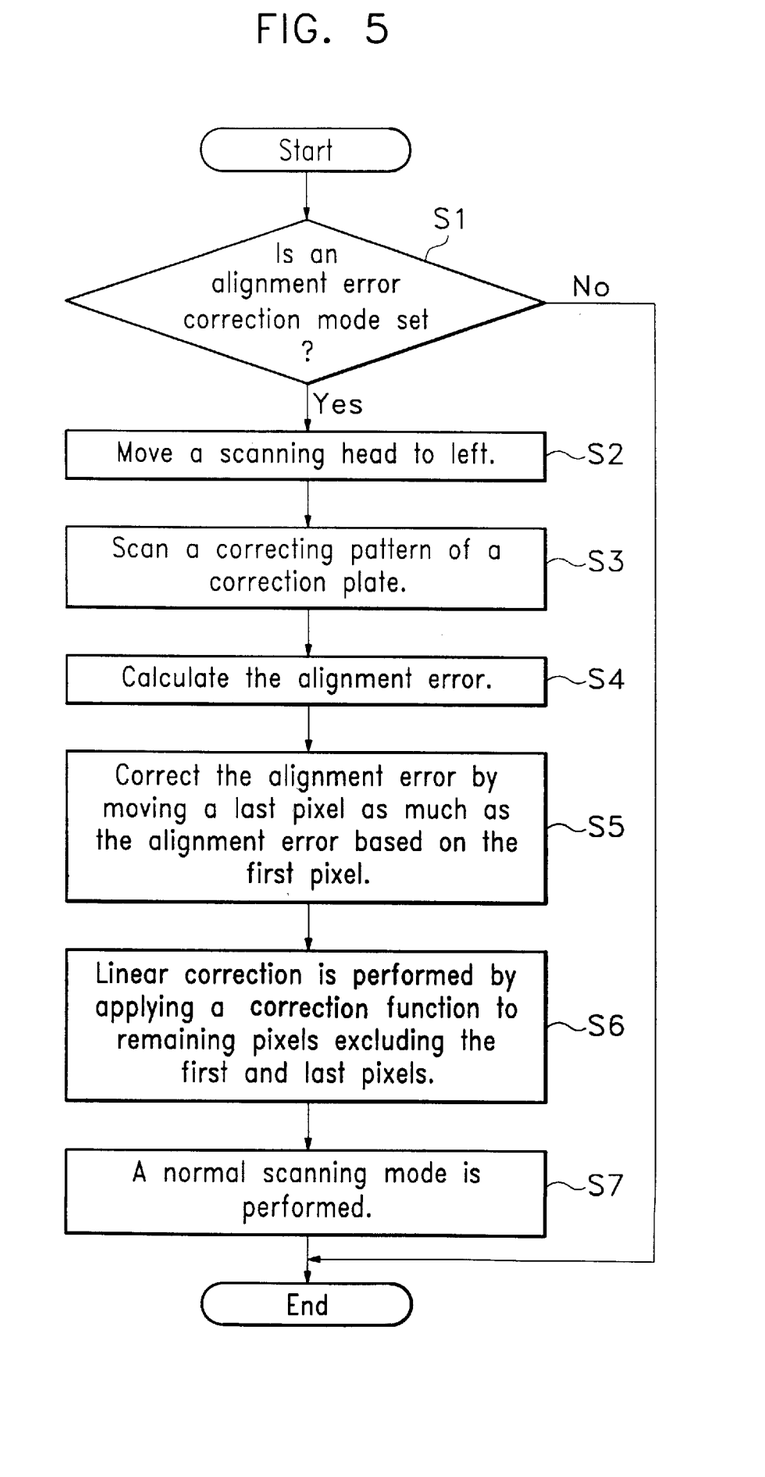
FIG. 5 is a flowchart illustrating a process of performing a method for correcting an alignment error of an scanning head of the shuttle type scanner according to the present invention.

When it is judged that the alignment error correction mode is selected at step S1, central processing unit 13 moves scanning head 2 beyond one side (left) of document 1 by driving carriage return motor 4 (step S2). Accordingly, the optical sensor of the scanning head 2 arrives at a position facing correcting pattern 9. At this time, central processing unit 13 controls the scanning of correcting pattern 9 by operating the optical sensor of scanning head 2 (step S3). As a result, the optical sensor scans correcting pattern 9 and the scanned image data are stored in memory 11.

Afterwards, central processing unit 13 calculates the alignment error of the pattern image data stored in the memory 11 per unit of pixel by controlling operation unit 12 (step S4), and corrects the alignment error by moving the last pixel as much as the alignment error based on the first pixel (step S5).

Figure 6:
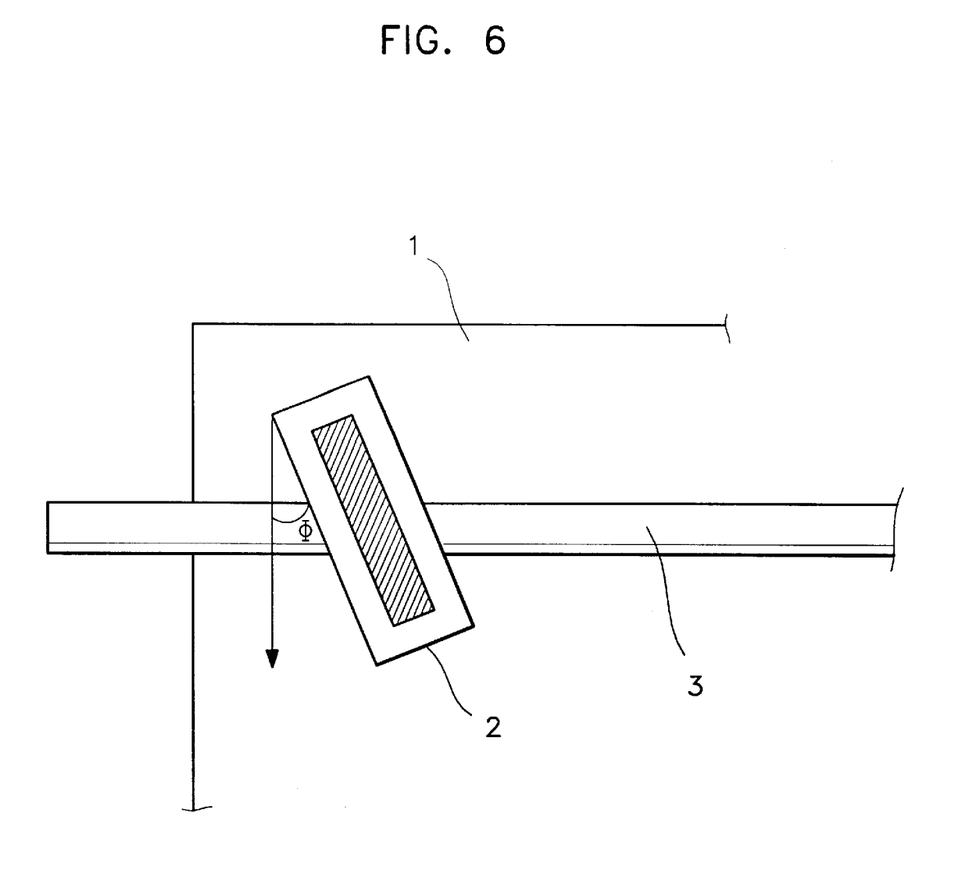
FIG. 6 is a view illustrating an alignment error angle of the scanning head.

Here, the method for calculating the alignment error of the pattern image data is expressed in the following equation:

$$\tan \Phi = D/V$$

wherein, $\Phi$ is an alignment error angle, V is a total number of pixels in the vertical axis and D is the number of pixels in which the alignment error occurs in the horizontal axis. FIG. 6 is a view illustrating an alignment error angle $\Phi$ of the scanning head 2.

If the band size of the scanned pattern is defined as a size which can be scanned in one scanning by the scanning head, the last pixel of the band is compulsorily moved to the position of the first pixel and corrected and the rest of the pixels, excluding the first and last pixels, are linearly corrected by using differentiation. When corrections of the first and last pixels of the image data are completed, a linear correction is performed by applying a correction function to the remaining pixels excluding the first and last pixels (step S6). Here, the correction function applied to perform the linear correction is as follows:

$$d/dV \mathrm{drop} D = -V \times \tan \Phi$$

Figure 7A:
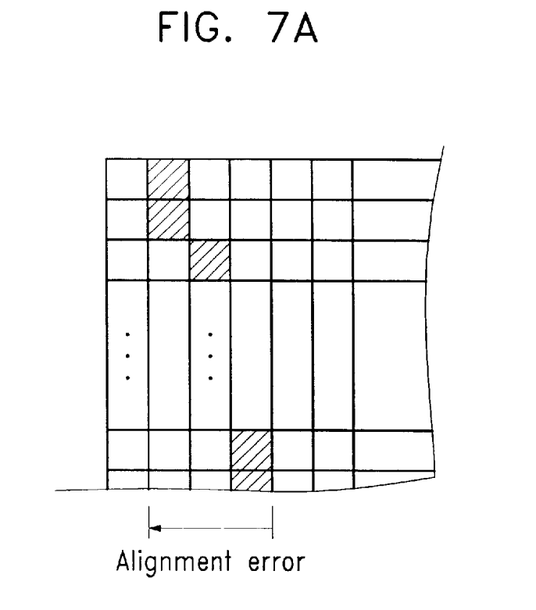
FIG. 7A is a view illustrating a pattern data scanned by the scanning head having the alignment error.
Figure 7B:
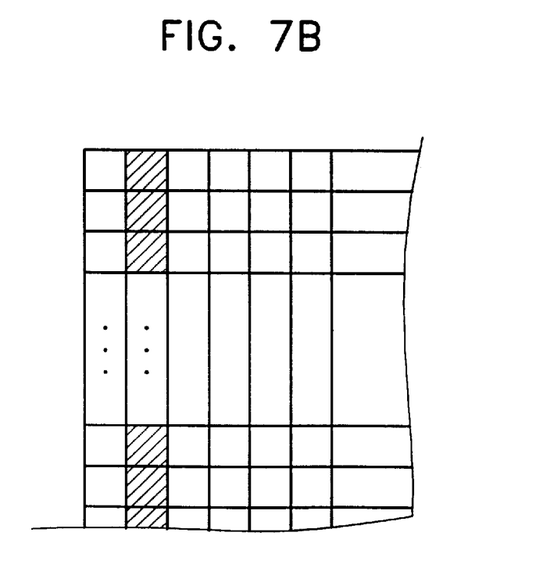
FIG. 7B is a view illustrating the pattern data after the alignment error is corrected.

When the linear correction to the alignment error is performed, central processing unit 13 performs a normal scanning mode (step S7). FIG. 7A is a view illustrating a pattern data scanned by the scanning head having the alignment error, and FIG. 7B is a view illustrating the pattern data after the alignment error is corrected.

As described above, correcting pattern 9 of the correction plate 8 applied to the present invention can have any color suitable to the signal processing of the pattern image data scanned by scanning head 2 besides the black color. Moreover, it is possible to mount correction plate to the right of document 1 instead of mounting at the left.

Since the size of the correcting pattern 9 is set to correspond to the size of the optical sensor located at the scanning head 2, this size can vary according to the manufacturing standard of the product.

In addition, it is possible to change the alignment error limit within the scope of the present invention, and it doesn't matter even if the limit varies according to each manufacturer.

As described above, according to the method and apparatus for correcting the alignment error of the scanning head of the shuttle type scanner according to the present invention, the alignment error of the scanner having the alignment error with the permitted limit is corrected by the software, and unnecessary operations occurred in correcting the alignment error mechanically are removed, thereby increasing the productivity.

In addition, since the alignment error within the permitted limit is corrected by the software, a stable image data without any distortion can be obtained.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. For example, the invention can be applied to a multifunction machine (facsimile, copier, scanner and printer) having a scanner head and a printing head mounted side-by-side. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for correcting an alignment error of a scanning head of a shuttle type scanner comprising the steps of:
    moving said scanning head to a position facing a correcting pattern formed on a correction plate positioned to one side of a document to be scanned, when an alignment error correction mode is selected;
    generating scanned image data by scanning said correcting pattern;
    calculating said alignment error from said image data using a preset operation function;
    correcting said alignment error by moving first and last pixels of said scanned image data; and
    correcting said alignment error by applying a preset correction function to remaining pixels of said scanned image data excluding said first and last pixels.

2. The method as set forth in claim 1, wherein said alignment error correction mode is selected during manufacturing of said scanner.

3. The method as set forth in claim 1, wherein said alignment error correction mode is selected when starting a scanning operation.

4. The method as set forth in claim 1, wherein said alignment error correction mode is selected prior to each line of said document.

5. The method as set forth in claim 1, wherein said correcting pattern has a size of 1×N pixels, wherein 1 corresponds to a direction to which said scanning head performs a reciprocating movement, N corresponds to a direction perpendicular to the direction in which said scanning head performs said reciprocating movement, and N is a positive integer.

6. The method as set forth in claim 5, wherein N is equal to a number of aligned pixels stainable by said scanning head.

7. The method as set forth in claim 1, wherein said correcting pattern has color capable of being scanned by said scanning head.

8. The method as set forth in claim 7, wherein said color is a black.

9. The method as set forth in claim 1, wherein said preset operation function is:

$$\Phi = \tan^{-1} D/V$$

wherein, $\Phi$ is an alignment error angle, D is the number of pixels in which the alignment error occurs in a horizontal axis, and V is a total number of pixels in a vertical axis.

10. The method as set forth in claim 1, wherein said step of correcting said alignment error by moving first and last pixels of said scanned image data comprises a step of moving said last pixel to a position on a same vertical axis as said first pixel based on said first pixel.

11. The method as set forth in claim 1, wherein said preset correction function is a correction function of:

$$d/dV \text{drop} D = -V \times \tan \Phi$$

wherein, $\Phi$ is an alignment error angle, D is the number of pixels in which the alignment error occurs in a horizontal axis, and V is a total number of pixels in a vertical axis.

12. An apparatus for correcting an alignment error of a scanning head of a shuttle type scanner, in which said scanning head performs a reciprocating movement along a guide rail transverse to a document transporting direction, comprising:
- a correction plate mounted at one end of a path on which said scanning head performs the reciprocating movement;
- a correcting pattern formed on said correction plate and facing said scanning head;
- a memory for storing scanned image data of said correcting pattern when said correcting pattern is scanned by said scanning head;
- an operation unit which calculates an alignment error of said scanned image data stored in said memory using a preset operation function; and
- a central processing unit which controls the reciprocating movement of said scanning head, controls said operation unit to calculate the alignment error of said pattern image data and corrects said calculated alignment error using a preset correction function.

13. The apparatus as set forth in claim 12, wherein said correction plate is mounted at one end of a scanning path along which said scanning head performs the reciprocating movement, said one end being disposed at a position out of a scanning region of a document.

14. The apparatus as set forth in claim 13, wherein said one end is a left end of said scanning path.

15. The apparatus as set forth in claim 13, wherein said one end is a right end of said scanning path.

16. The apparatus as set forth in claim 12, wherein said correcting pattern has color capable of being scanned by said scanning head.

17. The apparatus as set forth in claim 16, wherein said color is black.

18. The apparatus as set forth in claim 12, wherein said correcting pattern has a size of 1 pixel in a direction perpendicular to said document transporting direction and has N pixels in a direction parallel to said document transporting direction, wherein N is equal to a number of aligned pixels stainable by said scanning head.

19. The apparatus as set forth in claim 12, wherein said correcting pattern has a band shape 1 pixel wide by 128 pixels long, wherein said 128 pixels are centrally aligned on said correction plate in a direction parallel to said document transporting direction; and
- said scanning head is capable of scanning an area 1 pixel wide by 128 pixels long.

20. The apparatus as set forth in claim 12, wherein said preset operation function is:

$$\Phi = \tan^{-1} D/V$$

wherein, $\Phi$ is an alignment error angle, D is the number of pixels in which the alignment error occurs in a horizontal axis, and V is a total number of pixels in a vertical axis.

21. The apparatus as set forth in claim 12, wherein said preset correction function is a correction function of:

$$d/dV \text{drop} D = -V \times \tan \Phi$$

wherein, $\Phi$ is an alignment error angle, D is the number of pixels in which the alignment error occurs in a horizontal axis, and V is a total number of pixels in a vertical axis.

* * * * *